(12) United States Patent
Hui et al.

(10) Patent No.: US 6,549,951 B1
(45) Date of Patent: Apr. 15, 2003

(54) METHOD AND DEVICE FOR CONTROLLING COMMUNICATIONS WITH A SERIAL BUS

(75) Inventors: Danny K. Hui, Newark, CA (US); Harry S. Hvostov, San Jose, CA (US); Anthony Fung, Pleasanton, CA (US); Peter Groz, San Jose, CA (US); Jim C. Hsu, Santa Clara, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/139,958

(22) Filed: Aug. 25, 1998

(51) Int. Cl.$^7$ ................................................ G06F 13/00
(52) U.S. Cl. ....................... 709/250; 709/102; 709/313; 710/20
(58) Field of Search ................................. 709/100, 101, 709/102, 104, 105, 106, 107, 230, 236, 246, 250, 319, 321, 320, 329, 313; 710/20, 52, 126, 129

(56) References Cited

U.S. PATENT DOCUMENTS

| | | | |
|---|---|---|---|
| 5,291,614 A | * 3/1994 | Baker et al. | 712/35 |
| 5,481,707 A | * 1/1996 | Murphy, Jr. et al. | 709/102 |
| 5,485,579 A | * 1/1996 | Hitz et al. | 709/221 |
| 5,515,538 A | * 5/1996 | Kleiman | 710/260 |
| 5,768,126 A | * 6/1998 | Frederick | 364/400.01 |
| 6,078,747 A | * 6/2000 | Jewitt | 395/712 |
| 6,243,778 B1 | 6/2001 | Fung et al. | 710/113 |

FOREIGN PATENT DOCUMENTS

EP 0 353 383 A2 2/1990

OTHER PUBLICATIONS

Ueda, S. et al., "High Performance Transport—HPT (Draft)," Retrieved from the Internet: <URL: ftp://ftp.pwg.org/pub/pwg/p1394/mtg091597/hpt03e.pdf>, retrieved on Apr. 18, 2002, published on Sep. 9, 1997, pp. 1–31, XP–002196624.

Ueda, S. et al., "High Performance Transport (HPT)," Retrieved from the Internet: <URL:ftp://ftp.pwg.org/pub/pwg/p1394/mtg091597/hptpres9.pdf>, retrieved on Apr. 18, 2002, published on Sep. 15, 1997, pp. 1–10, XP–002196622.

Ueda, S. et al., "Simple High Performance Transport—SHPT (Draft)," Retrieved from the Internet: <URL:ftp://ftp.pwg.org/pub/pwg/p1394/mtg040698/shpt04d.pdf>, retrieved on Apr. 18, 2002, published on Mar. 31, 1998, pp. 1–19, XP–002196623.

U.S. patent application Ser. No. 09/163,096, Fury et al., filed Sep. 29, 1998.

* cited by examiner

Primary Examiner—Viet D. Vu
(74) Attorney, Agent, or Firm—David V. Carlson; Lisa K. Jorgenson (57) ABSTRACT

A system architecture for a high speed serial bus compatible with the 1394 standard is disclosed. A transaction interface coordinates data packets received from or sent to a 1394 bus. A kernel/scheduler/dispatcher is used to allocate memory resources, and start a variety of tasks and services. The tasks and services vary depending on protocols used in a transport layer and application layer used in conjunction with the 1394 layers. The transaction interface uses information derived from the data packets received to form message control blocks, particular for each individual task, and places the control blocks into the proper task queue. The transaction interface forms a dispatcher message control block and places it into the scheduler/dispatcher queue to initiate the task. If there are no other message control blocks in the queue particular for the called task, the called task is immediately started. Otherwise, the message control block waits in the queue to eventually be operated on.

31 Claims, 6 Drawing Sheets

1. MMC Block Data structure

| Byte Offset | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|
| 00 | tl ||||||| spd |||| timer_ID ||||
| 02 | source_ID ||||||||||||||||
| 04 | mgmt_ORB_addr (hi) ||||||||||||||||
| 06 | mgmt_ORB_addr (mid) ||||||||||||||||
| 08 | mgmt_ORB_addr (lo) ||||||||||||||||
| 10 | task_state |||||||| next_task_state ||||||||
| 12–42 | Management ORB or Task ORB (32 bytes) ||||||||||||||||
| 44 | next_MMC_Blk_pointer ||||||||||||||||

Descriptions of each field:

| | |
|---|---|
| tl | Transaction label |
| spd | Speed to communicate with the initiator |
| timer_ID | The timer allocated for this management ORB |
| source_ID | Initiator node ID |
| mgmt_ORB_addr | Address of the management ORB address |
| task_state | Internal state of the Management Agent Task |
| next_task_state | The next task_state to transition to |
| Management ORB or Task ORB | The 32 byte ORB content from the initiator |
| next_MMC_Blk_pointer | Pointer to the next MMC Block |

METHOD AND DEVICE FOR CONTROLLING COMMUNICATIONS WITH A SERIAL BUS

TECHNICAL FIELD

This invention relates to communication between devices connected to a data communication system. More specifically, this invention relates to a communication controller that receives data packets from a high-speed serial bus and causes functions to be performed at nodes of the bus based on the contents of the data packets.

BACKGROUND OF THE INVENTION

In general, there are two types of data buses: serial and parallel. A parallel bus is typically measured in capacity and speed. Parallel bus width capacity is measured in bytes and speed is usually measured in MHz or byte/second. For example, the popular Peripheral Component Interconnect (PCI) bus is a parallel bus 32 bits wide and operating up to 33 MHz. At this frequency it can carry data at a rate of over 1 Gigabit per second (1 Gbps). A defining feature of a parallel bus is that all of the bits in its width are sent simultaneously, for instance, in the PCI bus, all 32 bits are sent at the same time during a cycle. This requires at least as many signal lines in the bus as its width, and additional lines for addressing, power, and other signals. The PCI bus has nearly 50 signal lines. Signal lines are usually embodied as traces on a printed circuit board or wires. The large number of signal lines in a parallel bus makes it expensive to implement. Additionally, the number of devices on a PCI bus is limited and each device requires a card and an open corresponding card slot to plug into the bus.

A serial bus, conversely, transfers data one bit at a time. Although this reduces the number of lines needed for the serial bus, it greatly extends the time needed to transmit data as compared to a parallel bus. For instance, if operating at the same frequency, a serial bus transmits only one bit of data in the same time a PCI bus transmits 32 bits. An example of a serial bus is the Universal Serial Bus (USB). This bus contains 4 wires, and has a maximum data rate of 12 Megabits per second (Mbps). The low number of wires makes a serial bus ideal for interconnecting devices via a cable, as the cable can be manufactured inexpensively. However, because data intensive applications require a high volume of data to be quickly moved, manufacturers have generally relied on parallel, rather than serial buses for interconnecting data-intensive devices. Applications using such data-intensive devices include video and audio reproduction, and high-speed storage mechanisms such as hard disk drives, among others.

Until now, designers of systems that move data over a bus had to choose between the fast and expensive parallel bus, or the slow and inexpensive serial bus. Recently, specifications for a high-speed serial bus were adopted by the Institute of Electrical and Electronics Engineers. The specification, IEEE 1394-1995, is known as "FireWire", or simply, 1394. The 1394 specification includes standards for data transfer rates of up to 400 Mbps using only 2 pairs of data wires and I pair of wires for power. This data rate is fast enough to accommodate the data intensive needs of video, audio and high speed storage. Future needs will be met by another proposed 1394standard having a data rate over 1 Gbps. Therefore, by using a 1394 standard bus, data intensive tasks can be inexpensively implemented on a serial bus without the drawbacks of using a parallel bus.

The 1394 bus uses a peer-to-peer architecture. Physical and logical nodes attach to the 1394 bus by means of a six-conductor cable. Up to 63 nodes can be connected on each independent bus bridge, and 1,023 bridges are allowed in the system, for a total of over 65,000 devices on one 1394 system. It is likely that a 1394-to-PCI interface, possibly using the Open Host Controller Interface (OHCI) standard, will be used when using a 1394 bus in a computer. However, strictly speaking, the 1394 bus can operate independently from a computer by coupling related devices together via the connection cable. In addition to a cable specification, a backplane specification is provided for the 1394 bus. The backplane specification will most likely be used for a bus within a computer or some other wholly-contained system. The communication controller described herein operates in either the cable or backplane environment.

The 1394 standard specifies three "layers," physical, link, and transaction. The physical layer transmits electrical signals along the serial bus, arbitrates the bus by ensuring that only one node is sending data at a time, and translates electrical signals sensed from the bus into data signals for the link layer. The link layer assembles the data signals retrieved from the bus into data packets, and provides services such as addressing, data checking, and generating a "cycle" signal used for timing and synchronization. The transaction layer accepts the data packets from the link layer and includes bus transactions required to support a command and status register (CSR) architecture, including read, write, and lock. Several other buses use the CSR standard and specifying that 1394 must also conform to the CSR standard makes it easy to adapt or connect a 1394 bus to these other buses. Generally, the physical and link layers, as well as a limited number of transaction functions appear in hardware. The remainder of the transaction layer functions are performed in software.

To be useful, additional communication layers must communicate with and operate above the 1394 layers. For instance, directly above the transaction layer is a transport layer, using for example, Serial Bus Protocol-2 (SBP-2) or Functional Control Protocol (FCP). These standards define a protocol for the transport of commands and data over high performance serial buses. Additionally, above the transport layer is an application layer using such protocol standards as Reduced Block Commands (RBC), Printer Working Group (PWG), or Internet Protocol (IP). The interaction of these layers with each other and with the layers of the 1394 specification are further described herein.

It is thus desirable to have a communication controller that performs all of the duties outlined in the 1394 specification in an expedient manner. It is also desirable for the communication controller to be easily scaleable to include new services and tasks. It is also an advantage to develop a communication controller architecture that can be easily modified for a variety of roles and functions.

SUMMARY OF THE INVENTION

In a data communication system, for instance a 1394 bus system, a transaction interface operates at a logical node on the bus. As packets are sent along the bus directed towards the specific node on which the transaction interface sits, the transaction interface decodes the packet contents into control blocks for further operation. The further operation can include execution by an application also operating at the local node. Additionally, the application may require data to be transmitted to another node on the bus. In this case, the application communicates with the transaction interface via message control blocks, which are then converted into data signals and placed on the bus to be received at the destination node.

In accordance with one aspect of the present invention, a communication controller is provided including a transaction interface structured to accept data packets from the bus and perform actions responsive to data contained within the data packets. Also, a dispatcher is included that is structured to receive information provided to it and issue start commands responsive to the information received. Additionally included are a plurality of separate, independent tasks that each perform a specialized function responsive to data provided to it. Each task is scheduled to execute when data is provided to it by the transaction interface or any of the other tasks. Each task is structured to execute until it has exhausted all of the data provided to it. Each task is executed after the dispatcher issues a start command for that task, the start command issued by the dispatcher only when the dispatcher receives an indication from the transaction interface or the task that provided data to the task that the particular task is not presently executing. Finally, each task is structured to operate concurrently with and independently from all of the other tasks.

In another aspect of the present invention, a method of communicating over a serial bus is provided. This method includes receiving packets of information from the serial bus at a transaction interface, decoding the packets and analyzing the information received to determine if a service or a task should be called. If a service or task should called, data is formatted to be placed into a queue associated with one of a plurality of services or tasks, and the data so placed. The service or task is started if no data was already present in the respective queue of the service or task being called. The data is removed from the queue when it is no longer being operated upon by the service or task. Additionally, the task or service then continues operating until all data is removed from the queue.

DETAILED DESCRIPTION OF THE INVENTION

Figure 1:
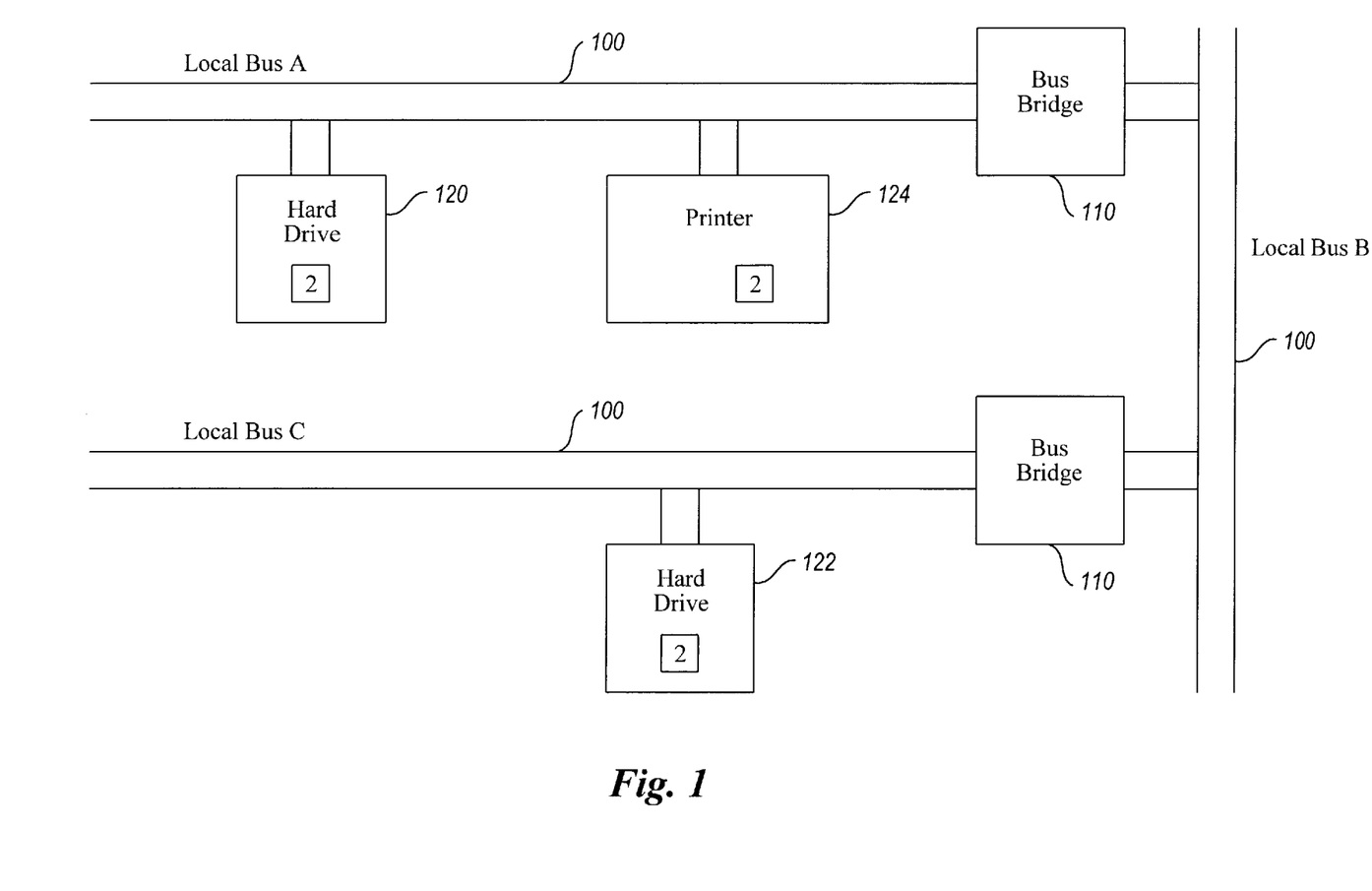
FIG. 1 is a diagram showing a possible 1394 bus configuration.

FIG. 1 shows one method of implementing a 1394 bus architecture. A bus 100 is subdivided into three local buses, A, B, and C. Both the local bus A and local bus C use a bus bridge 110 to connect to the local bus B. Devices sit as nodes on the local buses. A layer structure 2, described below, is contained within all of the nodes on the bus. The devices can be any device used to generate, accept, or transmit data, such as a first hard disk drive 20, a second hard disk drive 122, or a printer 124. Each local bus can have a maximum of 63 nodes, however, by using bus bridges, a 1394 bus system can have over 65,000 nodes. Typically data traffic is limited to a local bus so that, for example, devices on the local bus C cannot see data passed on local bus A. This increases bandwidth of the bus system by only passing data on a local bus that is directed to that local bus. The bus bridge 110 monitors bus traffic on the local bus to which it is attached looking for data intended for a node on another local bus. If such data is sensed, the bus bridge 110 forwards the data to the desired bus. Therefore, the printer 124 on the local bus A can receive data from either the hard disk drive 120 (on local bus A) or from the hard disk drive 122 through the local bus bridge 110 (on local bus B). Additionally, the bus bridge 110 could couple the 1394 bus to a bus typically used in a computer, such as a PCI bus (not shown).

Figure 2:
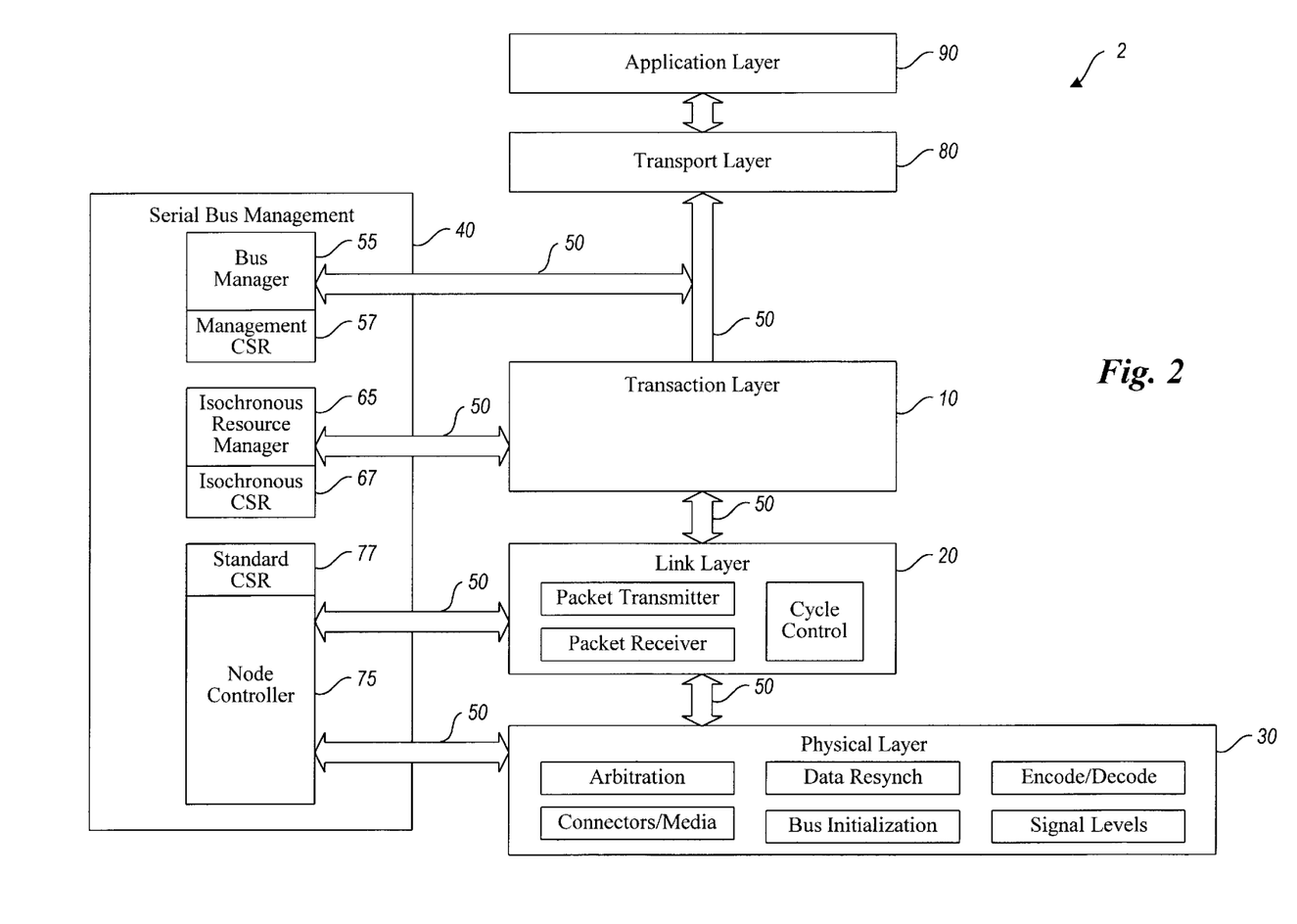
FIG. 2 is a diagram showing layers of the 1394 standard as well as layers that interact with the layers of the 1394 standard.

FIG. 2 shows a general overview of the layer structure 2 of 1394, including serial bus management. This layer structure appears in every node attached to a local 1394 bus. The layer structure 2 includes a transaction layer 10, a link layer 20, a physical layer 30, and serial bus management 40. In conjunction with the 1394 layers, a transport layer 80 and an application layer 90 are also used, as described above. Communication between the layers 10, 20, 30 and serial bus management 40 as well as with the layers 80 and 90 is through bi-directional inter-layer communication 50, which can include more than one communication path. Communication 50 need not be a data bus, but may be any of a number of communication methods, such as signal wires, shared memory resources, or other means. As shown in FIG. 2, the transaction layer directly communicates with the link layer 20, a bus manager 55 and passes isochronous signals to an isochronous resource manager 65 contained within the serial bus management 40.

Layers in a communication system, such as the 1394 bus are situated to work independent from but in conjunction with layers around them. Generally, the farther a layer is from the hardware, such as the data wires of a 1394 bus, the higher order it is. Higher order layers can perform higher order functions. For instance, the transaction layer 10 of the 1394 specification performs only read, write and lock functions. A transport layer 80 communicates with the transaction layer 10 and has higher order commands. The particular transport layer standard used determines its commands. For examples, in the SBP-2 transport layer, commands such as log in, reconnect, and set password, for example, are available. Above the transport layer 80 is an application layer 90, that uses protocols such as RBC, PWG, or IP. The application layer 90 works in conjunction with software to perform the desired application.

The 1394 specification includes two basic data transfer services, isochronous data transfer and asynchronous data transfer. The isochronous data transfer specification provides for packets to be sent along the high-speed serial bus at regular intervals. Typically the isochronous data transfer services are used for large volumes of data carried between a data generator and a data receiver, for example, a digital video camera and multimedia electronics, such as a video display, or video editor. Isochronous data transfer communicates directly with the link layer 20 and bypasses the transaction layer 10. The transaction layer is only used for asynchronous data transfer. The majority of the bandwidth within the 1394 specification is reserved for isochronous data transfer, with twenty percent of the bandwidth being for asynchronous data transfer.

A node controller 75 is connected directly to the link and physical layers. The bus manager 55, the isochronous resource manager 65 and node controller 75 are each driven according to the CSR standard, IEEE 1212-1991. Other types of buses also utilize this CSR standard, expanding the connectivity of a 1394 bus. The CSRs are located within the serial bus management 40 and are represented as a management CSR 57, an isochronous CSR 67, and standard CSR 77.

The layer structure 2 including serial bus management 40 resides in each node along the bus. However, only one bus manager 55 and one isochronous resource manager 65 on the local bus is active. These managers exercise management responsibilities over the entire local bus. Since each local bus only needs (and may only have) one bus manager 55 and one isochronous resource manager 65, the other nodes disable their respective bus manager and isochronous resource managers. The node controller 75 is active for all operative nodes.

As stated above, the link layer 20 and physical layer 30 are generally embodied in hardware, for example, a chip available from Silicon System Design, Inc., or also available from Texas Instruments, Inc. The transaction layer 10, transport layer 80, application layer 90, and other functions of the transport interface will generally be implemented in software form, i.e., a software program executed once it is loaded into memory. In a preferred embodiment, the layers and functions are stored in firmware, e.g., codes programmed into a programmable storage device, such as a Read Only Memory (ROM), a Programmable Logic Array (PLA) or Disk Drive overlay. Further, the layers and functions could be programmed into an Application Specific Integrated Circuit (ASIC), by a method well known in the art. Generally, a collection of operations, such as those listed above operates faster in hardware rather than software, however, a software program is easier to change, correct, and update. The preferred embodiment of firmware combines advantages of both hardware and software.

Figure 3:
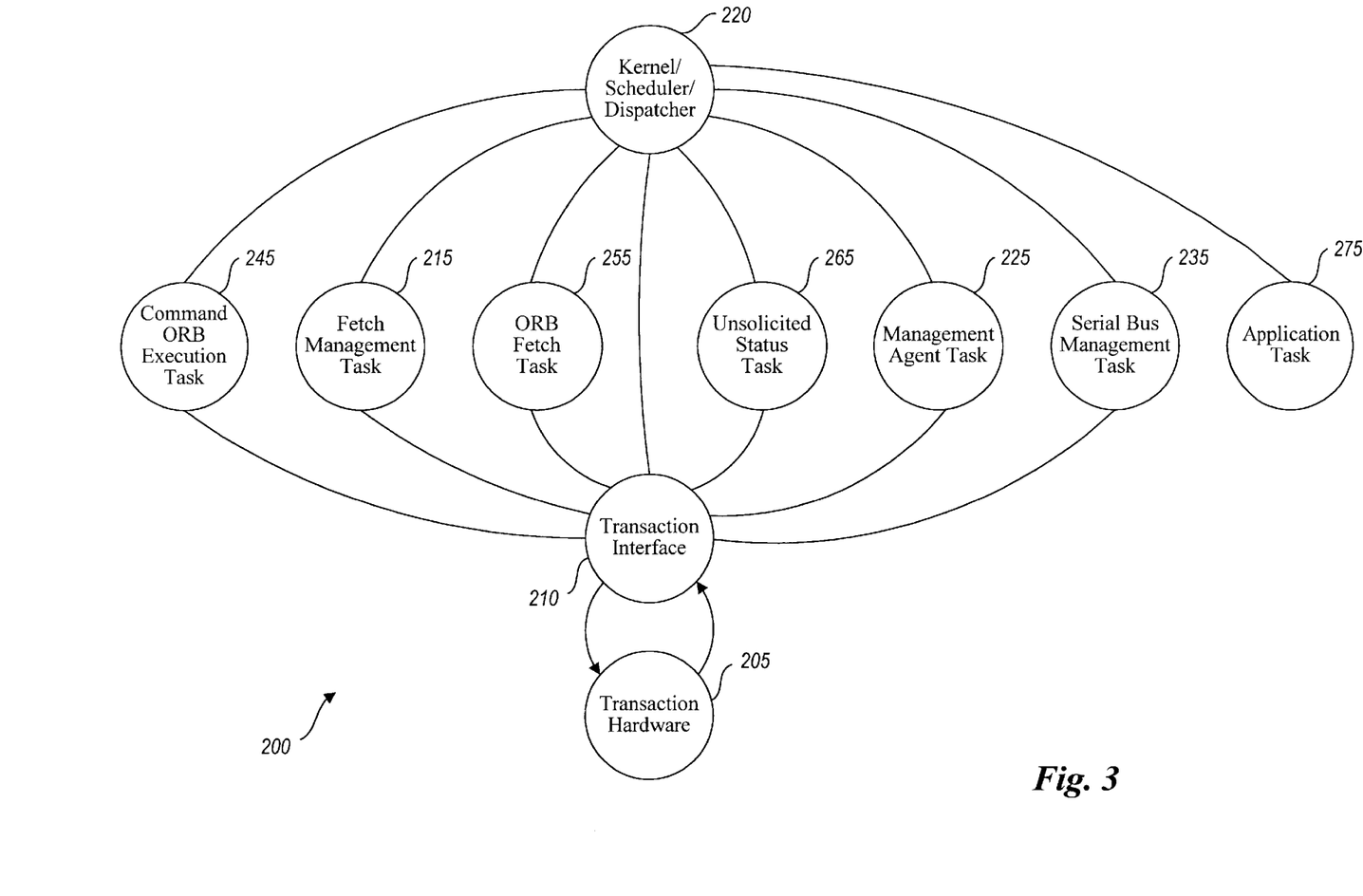
FIG. 3 is a diagram showing services and tasks according to an embodiment of the present invention.

FIG. 3 shows an embodiment of the present invention. A communication controller 200 appears in each node on the bus, such as in the Hard Disk Drives 120, 122 or in the Printer 124 shown in FIG. 1. The Transaction Interface 210 embodies some of the components shown in FIG. 2. With reference to the components shown in FIG. 3, a chip embodying Transaction Hardware 205 could be the previously mentioned chips by Silicon System Design or Texas Instruments. The Transaction Interface 210 implements the 1394 transaction layer. The Serial Bus Management Task 235 implements bus management functions, such as reset or power on reset. The remainder of the representations shown on FIG. 3 implement functions and commands determined by the transport layer, such as SBP-2, in conjunction with the application layer, such as RBC.

With the exception of the Transaction Hardware 205, representations in FIG. 3 can be divided into two classifications, services and tasks. A task can call other tasks or services. A service can only respond when called by a task, and when complete, returns to the calling task. The Transaction Interface 210 is a service, along with a Kernel/Scheduler/Dispatcher 220. The remainder of the representations shown in FIG. 3 are tasks, as described below.

The Transaction Hardware 205 monitors the 1394 bus and converts electrical signals sensed from the bus into data packets. The Transaction Interface 210 decodes the data packets received from the Transaction Hardware 205. These data packets are analyzed to determine if a task or service should be called, or if no action is required. If a task or service needs to be called, the Transaction Interface 210 generates a message control block (MCB) based on the contents of the data packet and calls the desired task or service. Message control blocks are used for all inter-task or service communication and are further described below.

The smallest unit of data that the Transaction Interface 210 can operate upon is one data packet. A data packet is a group of data. At its lowest element, a digital datum is either a 1 or 0. Each individual piece of datum is called a bit. A collection of 8 bits is termed a byte, and a collection of 4 bytes (32 bits) is termed a quadlet. An asynchronous packet must be at least 4 quadlets, or 128 bits long. The first 128 bits are called a packet header. An asynchronous packet may also include a data block. The size of the data block varies but is limited to an absolute maximum based on the speed at which the 1394 bus is operating. The 1394 bus includes specifications to operate at 98.304 Mbps, 196.608 Mbps, or 393.216 Mbps. These speeds are often rounded to, respectively, 100, 200, and 400 Mbps, and are labeled S100, S200, and S400. When operating at the S100 speed, the maximum block size is 512 bytes (or 128 quadlets). When operating at S200 and S400, the maximum block size is 1024 bytes and 2048 bytes, respectively. When higher bus speed standards are approved, presumably maximum block size will increase as well.

The Transaction Interface 210 receives data from and transmits data to the 1394 bus. Concerning the transaction layer 10 of FIG. 2, there are three main functions that are sent in packets along the bus and processed by the Transaction Interface 210. These are read, write, and lock functions. For each of these functions, there are two main operations, request and response. A request is asking that a read, write or lock take place, and a response indicates that the read, write or lock was attempted, and includes a result.

Packets destined for the target node on which the Transaction Interface 210 sits are placed on the 1394 bus by an initiator. Packets routed to that particular node address are received at a receive bay in the Transaction Hardware 205 and an interrupt is generated to the Transaction Interface 210. Once the Transaction Interface 210 has completed its current task, an interrupt service routine is entered. In one embodiment, the seven types of packets that cause the interrupt are identified by a 4-bit transaction code contained in the packet header. The transaction codes for this embodiment of the invention are defined as follows:

| Transaction Code | Meaning |
| --- | --- |
| 0 | Write request for data quadlet |
| 1 | Write request for data block |
| 2 | Write response |
| 4 | Read request for data quadlet |
| 5 | Read request for data block |
| 6 | Read response for data quadlet |
| 7 | Read response for data block |
| B | Lock response |

As described above, a quadlet is 4 bytes and a block is either 512, 1024, or 2048 bytes, depending on the speed at which the bus is operating. A write request for a data block is asking that a data block be written to a specified destination memory address at a particular node. A write request for a data quadlet is identical to a write request for a data block, however, the amount of data written to the specified destination address fits within one data quadlet. A read request for a data block and read request for a data quadlet are requests to retrieve data from the specified destination memory address at the specified node.

Write and read requests are responded to by sending responses, including both read and write responses for both data quadlets and data blocks. A read response for a data quadlet is sent in reply to a read request for a data quadlet, with the data requested passed back within the packet header. A read response for a data block is similar to a read response for a data quadlet, however, much more data is passed back. If for some reason the read request could not be performed, no data is sent back, but an error status may be sent to the requesting node. Write responses are sent in reply to a write request for either a data quadlet or a data block. The responses send back a response code indicating whether the write was successful, and if not, relays the specific reason why it failed. In the write response, the packet header includes this response code.

Lock requests and responses work in the same way, except that only an address, rather than actual data need be sent.

Figure 5:
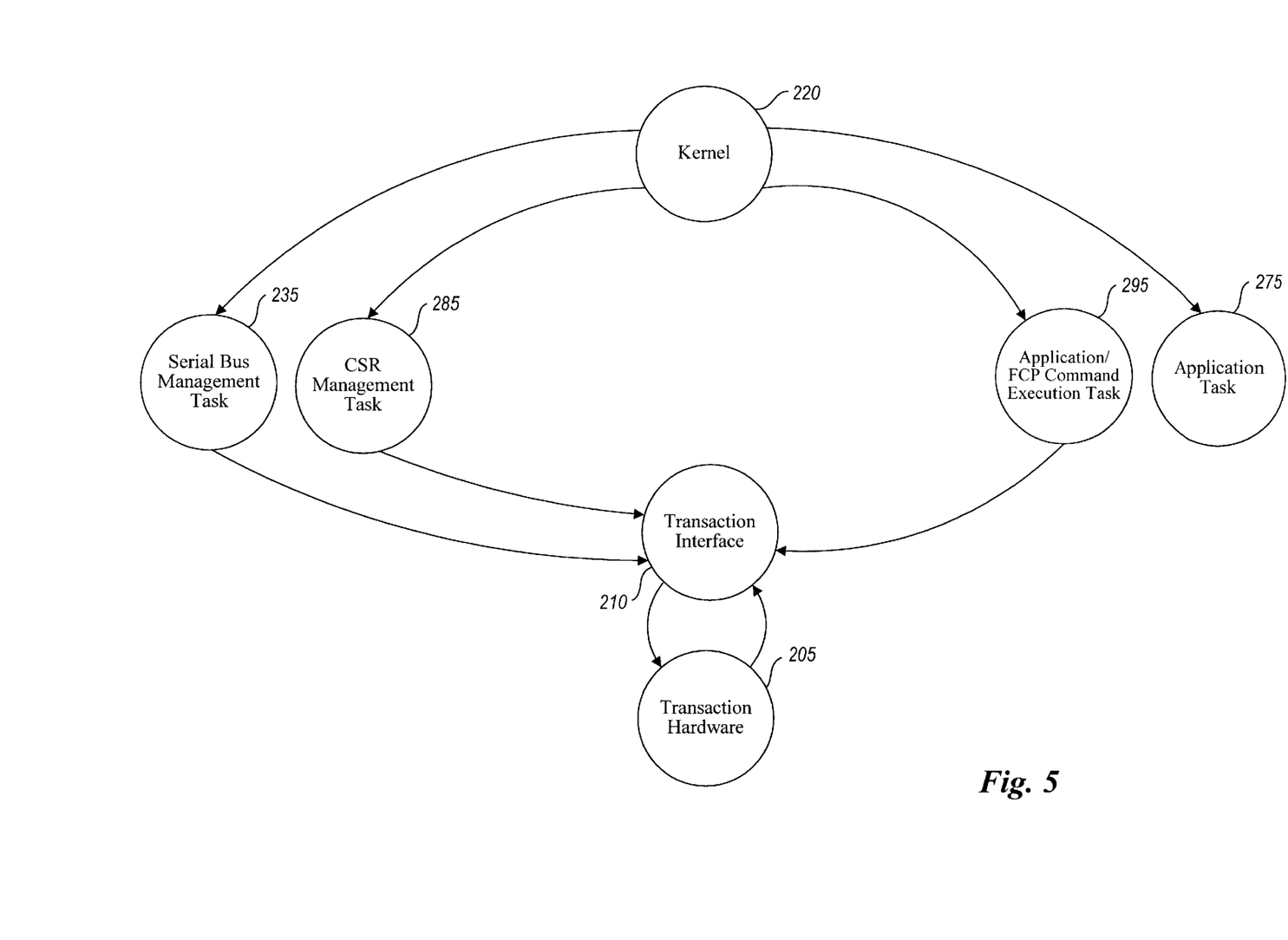
FIG. 5 is a diagram showing services and tasks according to another embodiment of the present invention.

With reference to FIG. 3, the Transaction Interface 210 and Kernel/Scheduler/Dispatcher 220 will be present for all embodiments of the invention. Additionally, one or more tasks will be present, depending on which protocol is used for the transport layer 80 and the application layer 90 shown on FIG. 2. In the embodiment shown in FIG. 3, seven tasks are shown. These tasks are structured to perform functions required when using the SBP-2 protocol for the transport layer 80. The invention is thus scaleable to accommodate any protocol used. For example, the embodiment shown in FIG. 5 shows tasks optimized for the FCP. Thus, one or more tasks can be used to implement any protocol desired.

Referring back to FIG. 3, the seven tasks shown enable the invention to work with the SBP-2 protocol. The Transaction Interface 210 takes different action depending on the transaction code received. For instance, when a write request for a data quadlet or a data block, or a read request for a data quadlet or a data block is received by the Transaction Interface 210, the Transaction Interface performs an ordered set of operations involving calling one or more tasks.

Services and tasks shown in FIG. 3 communicate with one another through message control blocks (MCB) placed in queues related to the called services and tasks. Each task shown in FIG. 3 has at least one respective associated queue. Information transferred between tasks is only via MCBs. Each specific task has its own type of control block including data specifically needed by that task to operate. Shown in FIG. 3 are seven tasks, a Command ORB Execution Task 245 which uses a command message control (CMC) block, a Fetch Management Task 215, which uses a fetch management message control (FMC) block, an ORB Fetch Task 255, which uses an ORB fetch message control (OMC) block, an Unsolicited Status Task 265 which uses an unsolicited status message control (UMC) block, a Management Agent Task 225 which uses a management agent message control (MMC) block, a Serial Bus Management Task which uses a Serial Bus Message Control (SMC) block, and an Application Task 275 that uses an application message control (AMC) block. The services also have MCB's specifically for them. The Dispatcher 220 uses dispatch message control (DMC) blocks and the Transaction Interface 210 uses transaction message control (TMC) blocks. In addition, each task and service has at least one queue into which the respective MCB is placed. For instance, the Management Agent Task 225 has a management agent task queue structured to receive MMC blocks. Nothing in the architecture limits the association of tasks and queues. For instance, one task may have multiple queues or one queue may be associated with multiple tasks. Any degree of association between tasks and queues is possible.

Figure 4:
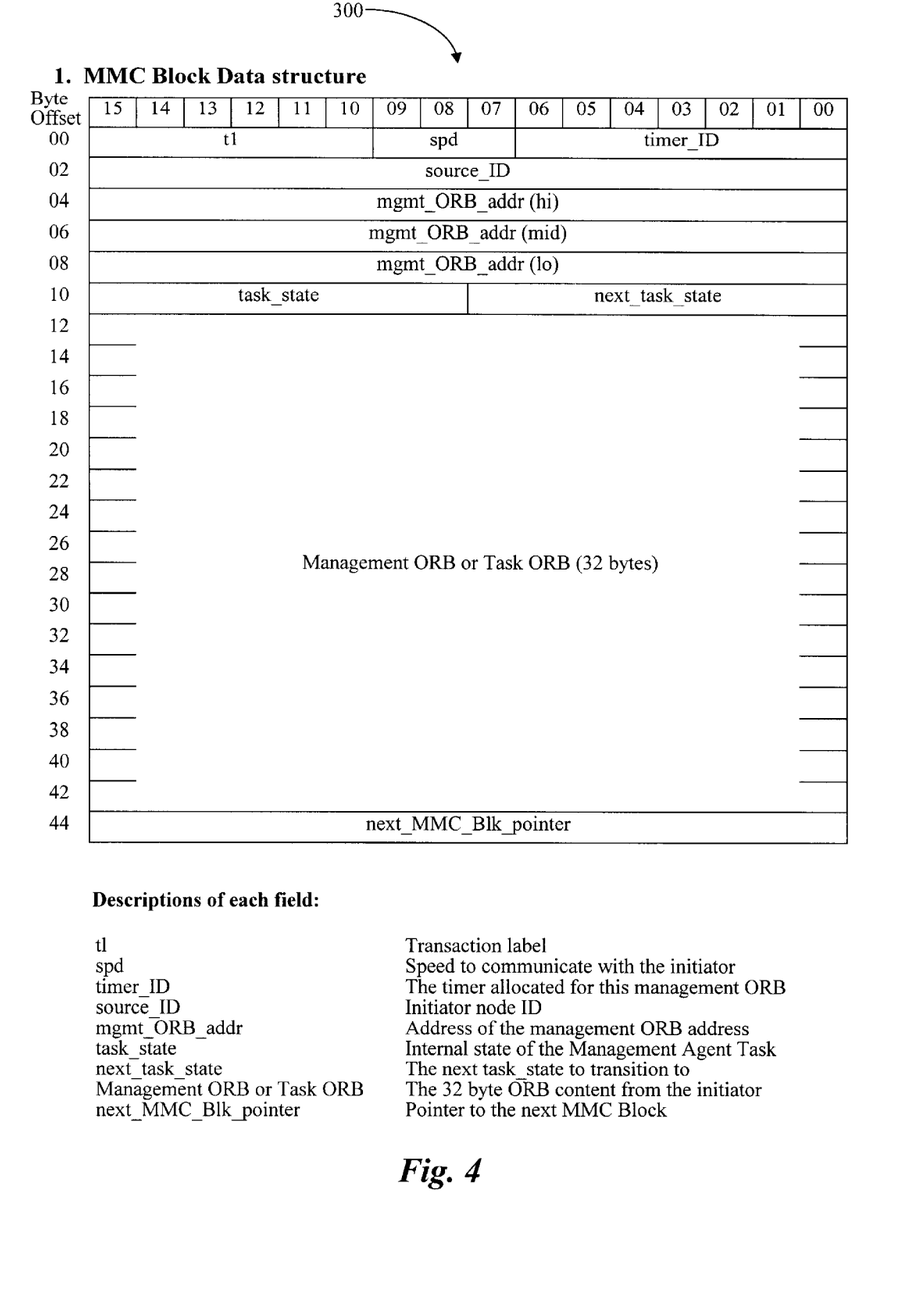
FIG. 4 is a chart showing a message control block structure.

As an example of one type of MCB, FIG. 4 shows a management agent message control (MMC) block. Since every MCB is different, there is no such thing as a standard message control block, however, the MMC block is representative of the types of data contained in MCB's. When a task wants to schedule the Management Agent Task 225, the calling task builds an MMC block and places it into an MMC queue. An MMC block 300, shown in FIG. 4, includes 44 bytes of data. Each byte is numbered along the left-hand side for reference and a byte offset numbered 0–15 indicates the individual bits making up the two bytes of each line. Data useful to the task is placed in the MCB as described in FIG. 4. For instance, the speed at which the bus is operating occupies bits 8, 9, and 10 (having an offset of 7, 8, and 9) of the first two bytes of the MMC block. An address for a management operation request block (ORB) is 6 bytes long and includes bytes 4–9. This data is necessary and used by the Management Agent Task 225 during operations.

To call a task or service from another task, several steps are taken. First, an MCB is created for the particular task or service to be called. Then the MCB is placed into the queue associated with that particular task or service and a return code is sent back to the originating task. Then the originating task checks the return code. If the return code indicates that the MCB is not at the top of the queue, this means that the task is currently running and the originating task does nothing more. No action is taken because once started, a task operates on all of the MCB's in its queue until the queue is empty. Thus, the MCB recently placed in the task's queue will eventually be operated on, when it ascends to the top of the queue. If, however, the return code indicates that the MCB just placed into the task queue is already at the top of the queue, i.e., there are no other MCB's in that task queue, this tells the originating task that the called task is not already running and must be started.

To start a task, the originating task creates a dispatch message control (DMC) block for the Dispatcher 220. The DMC block indicates which task is to be started and what priority is to be given to the DMC block. The Dispatcher 220 includes a related queue that is continuously checked for entries. As entries are received by the Scheduler 220 to start the desired tasks, they are placed into the dispatcher queue according to priority, with the highest priority being placed highest in the queue. As with all of the queues, the dispatcher or task will not be interrupted from operating on its current MCB, even when an MCB having higher priority is placed in its queue. Instead, the Scheduler 220 orders DMC blocks based on priority of the new block and the blocks currently pending in the DMC queue, but not the DMC block currently being operated on. When the DMC block reaches the top of the DMC queue, the Dispatcher 220 looks in the DMC block to see which task or service is to be called, and then informs the called task that there is an MCB sitting in its own queue waiting to be operated on. That initiates the called task to begin operation. So, in order for one task to schedule another task or service to operate, either one or two MCBs must be created. First, an MCB is created specifically for the called task and placed in its associated queue. A return code is then checked by the originating task. If the return code indicates the MCB was placed in the queue but not at the top of the queue, the initiating task does nothing more because the called task is already running and will operate on the MCB when it moves to the head of the queue. If, however, the return code indicates that the MCB was placed at the top of the queue for the called task or service, a DMC block is generated by the originating task that indicates which task or service is to be called, and what priority is to be given the DMC block. The Scheduler 220 then places the DMC block in the appropriate location in the DMC queue, ordered by priority. When the DMC block reaches the top of the DMC queue, the called task or service is alerted that there is an MCB in its queue and to begin operation. The called task or service then begins, returns the DMC block to a free message blocks pool, and then operates on the MCB at the top of its own queue.

A common pool of resources exists for all MCBs. The message block pool is managed by the Kernel 220. The pool consists of a finite memory space from which MCBs can be created. As more MCBs are created, the amount of memory space left in the pool decreases. When no memory space remains in the free blocks pool, no more MCBs can be generated until more resources are supplied. Resources are supplied by returning MCBs back to the pool after they have been operated on and are no longer needed, i.e., when they are removed from the queue. When a task or service is finished using an MCB previously in its queue, it calls the Kernel 220 requesting that the MCB be placed back in the free blocks pool. It then moves the next free MCB to the top of its queue. Additionally, if a DMC block is necessary to start the task or service, the called task or service immediately returns the DMC block to the free memory blocks pool before operating its own MCB. The size of the free memory blocks pool is determined by the amount of memory available, and is fixed before any MCBs are allocated.

In addition to managing the dispatch queue and managing the free message blocks pool, the Kernel/Scheduler/Dispatcher 220 also performs other functions in 1394 bus transactions. The Kernel 220 initializes the data structures, timers, and interrupt vectors. All tasks that are timed require a timer. The Kernel 220 provides such timer management services as starting, stopping, restarting, checking, deleting and providing an interrupt based on the timers. The timers are allocated when requested by a task through a call to the Kernel services. Each timer currently active is adjusted every clock cycle. In one embodiment, a timer is initialized with a given number, which is decremented each clock cycle. When the timer value reaches zero, a notification is sent to the task associated with that timer.

As stated above, the particular tasks chosen to work with the Transaction Interface 210 and the Kernel/Scheduler/Dispatcher 220 depend on the transport layer 80 used in the particular system. In the embodiment shown in FIG. 3, the tasks have been selected to operate with the SBP-2 protocol for the transport layer. When other transport layer protocols are used, other tasks may be present or some of the tasks shown in FIG. 3 may not be present. In this way, the Communication Controller 200 is extremely flexible and scaleable, allowing for as much customization as is desired.

As shown in the embodiment shown in FIG. 3, the Command ORB Execution Task 245 operates on data and status transactions between the Application Task 275 and an initiator, typically located at a different node. In operation, the initiator will send data to or receive data from the Application Task 275. The Command ORB Execution Task 245 is the principle throughway for the data and status messages between them. The Fetch Management Task 215 ensures that an operation received at a particular node was intended for that node. If the operation is at the correct node, the Fetch Management Task 215 updates a variable used to indicate a current state of an agent. The ORB Fetch Task 255 receives several ORBs containing commands from an initiator, and passes them to the Application Task 275 to execute. The Unsolicited Status Task 265 sends a status message to the initiator when requested by one of the other tasks. The Management Agent Task 225 performs management-type functions requested by the initiator, including access requests, logging in, setting passwords, etc. The Serial Bus Management task 235 functions as an interface between the serial bus management 40 and the Application Task 275 for the same nodes. Finally, the Application Task 275 operates to execute upper protocol commands found in the Application Layer 90 of FIG. 1. The Application Task 275 is the ultimate origination or destination of the majority of data transferred along the 1394 bus.

Turning now to some of the specific instances of the tasks shown in FIG. 3, the Management Agent Task 225 responds to management type requests from an initiator. In response to a management agent CSR write sent by the initiator node, the Management Agent Task 225 fetches a management ORB from the initiator and then executes the ORB function. Examples of ORB functions include login, set password, reconnect, and terminate task. If the Management Agent Task 225 must communicate back to the initiator, it uses the transmitting portion of the Transaction Interface 210.

The Transaction Interface 210, in addition to receiving packets destined for the local node as described above, also prepares packets destined for other nodes. Once prepared, the Transaction Interface 210 transfers the packets to the link layer 20 where they are synchronized and sent to the physical layer 10 for conversion to electrical signals to be placed on the bus. Depending on the type and amount of data to be sent from the Transaction Interface 210, a transmit bay, payload data transmit bay, and/or a Direct Memory Address (DMA) channel may be used. If the amount of data to be sent from the Transaction Interface 210 is large, it may be broken up into several packets to be placed on the bus. Each packet is prepared and then sent along the bus.

Tasks desiring to send data to a node other than the one that they are on send the data through a transmitting portion of the Transaction Interface 210. The Transaction Interface 210 includes at least two queues to hold TMC blocks, one for time critical transactions and one for non-time critical transactions. Data to be sent along the bus are packaged into TMC blocks and placed into the time-critical or non-time critical queue as desired. The non-time critical TMC queue is used for data block transfer requests, whereas the time critical TMC queue is used for transactions that must be split into subactions. It may take multiple transactions to complete a non-time critical TMC block request. Once the transactions are complete, the Transaction Interface 210 sends notice to the task that is sending the data that the task is complete.

Each transaction that is initiated by the Transaction Interface 210 has a software timer associated with it. These software timer services are provided by the Kernel 220 as previously discussed. A retry count field of the TMC block is incremented if the data transmission is unsuccessful. As long as the retry count is below the programmable maximum number of retries, the Transaction Interface 210 will attempt to send the data again. If the maximum retry count has been exceeded, a status message is sent back to the calling task informing it of the failure. At the completion of a transaction, i.e., the Transaction Interface 210 received an acknowledgment from the node to which the data is being sent, the Transaction Interface 210 schedules a transaction completion status or other response data to return to the calling task. The data is placed into a DMC block and sent through the Dispatcher 220 to the calling task.

Returning to the Management Agent Task 225, after the task sends the data to the initiator, the task then becomes suspended pending notification from the Transaction Interface 210. When the Transaction Interface 210 completes the data transaction with the initiator, the transaction interface wakes up the Management Agent Task 225 by making a system call to the Scheduler 220. The Management Agent Task 225 then continues its execution of the management ORB for that task. Once complete, the Management Agent Task 225 discards the MMC block from the top of its queue, calls the kernel to return the MMC block to the free memory block pool, and begins operation on the next MMC block in its queue, if any. If the management ORB contains a login command, the Management Agent Task 225 creates an OMC block and a login descriptor list. The OMC block and login descriptor list are removed after the initiator logs out.

The Application Task 275 represents the application that would be operating at one of the nodes on the 1394 bus, for instance, high speed printers, high speed storage, or audio visual applications. Applications communicate via their native protocols using specific application protocols, such as Reduced Block Commands (RBC) for hard disk drives, Printer Working Group (PWG) for printers, or Internet Protocol (IP) for networks. Several applications can operate at one time on any given node. Each application decodes, validates, and executes commands delivered to it. Each separate application has a separate queue, identified by a number based on how many applications are running.

The ORB fetch task 255 functions to retrieve multiple command ORBs from one initiator at a time, passing the encapsulated commands to the Application Task 275 for execution. For every new fetch, a system call is made to determine the AMC block address requesting the fetch. This block address is then saved in the OMC block corresponding to the initiating task. The ORB address is retrieved from the OMC block. Then, the Transaction Interface 210 is scheduled to read and return the command ORBs. If the data comes back without error, an AMC block is generated and placed into the AMC queue, sending the retrieved data to the proper application task. Depending on how many initiators are present, the ORB Fetch Task 255 may limit the total number of ORBs in each fetch in order to provide fairness arbitration.

The Command ORB Execution Task 245 provides for data transfer requests and status delivery on behalf of the Application Task 275. The Command ORB Execution Task 245 retrieves the command it is to execute from the command message control (CMC) block that was placed in a CMC queue by the Transaction Interface 210. The Command ORB Execution Task 245 schedules the Transaction Interface 210 to send or retrieve the data or status as directed. Once complete, the Transaction Interface 210 wakes up the Command ORB execution task 245, which then notifies the particular Application Task 275 for which it is working, of the status of the ORB execution or provides the requested data.

The Fetch Management Task 215 processes two special write requests. In either case, the Fetch Management Task 215 updates a field in an OMC block.

Finally, the Unsolicited Status Task 265 operates to send a status signal to initiators at another node, even if not requested. This task would operate to notify the initiators that were logged in before resetting the node, for instance.

An example of the 1394 bus architecture in operation provides further understanding of the interoperation of the services and tasks. An example utilizing several of the tasks is an act of logging into the host via a management login ORB. This would occur, for example, when a printer is plugged into the 1394 bus. With reference to FIG. 3, the login begins with an initiator on a non-local node. The initiator sends one or more data packets to the Transaction Interface 210 on the local node, where it is received and decoded by the hardware receiving bay. The Transaction Interface 210 decodes a transaction code from the packet and decodes it to see that the initiating task requests data to be written at a destination address found on the local node (logging in to the host). This particular operation is a write management agent operation and first uses the Management Agent Task 225.

The Transaction Interface 210 requests a free MMC block from the Kernel 220, initializes the MMC block with data read from the received data packet, and queues it into the Management Agent Task 225 working queue. If a return code sent back to the Transaction Interface 210 shows that this MMC block is currently at the top of the queue, the Management Agent Task 225 is not currently operating and must be started. The Transaction Interface 210 builds a DMC block and calls the Dispatcher 220 to start the Management Agent Task 225. The Dispatcher 220 then notifies the Management Agent Task 225 that it has an entry in its queue. The Management Agent Task 225 decodes the MMC block in its queue and the operation contained within. The operation that was decoded tells the Management Agent Task 225 that it must read the management ORB from the host. This includes transmitting from the Transaction Interface 210. A TMC block is created, initialized with the management ORB address and other parameters and queued in one of the TMC queues. The Management Agent Task 225 updates a task state in the MMC block stating that it is waiting for a management ORB fetch. If a return code indicates the TMC block is at the top of the queue, the Transaction Interface 210 must be started through the Dispatcher 220. After it begins execution, the Transaction Interface 210 decodes the TMC block to see it must schedule a transmission. It is scheduled and executes.

The Transaction Interface 210 receives the management ORB from the initiator. The Transaction Interface 210 then calls the Management Agent Task 225 with the login command. The Management Agent Task 225 attempts to login for the initiator. If all login criteria are met, the Management Agent Task 225 requests a new OMC block. The OMC block is then initialized with pertinent data, and a login response is built. The login response is scheduled with the Transaction Interface 210 by queuing a TMC block to one of the TMC queues, telling the initiator that the login was successful. Later, a status block is sent back to the initiator by queuing a TMC block into one the TMC queues. After the status block is sent, the original MMC block is deallocated, returned to the free memory block pool, and the Management Agent Task 225 operates on the next highest MMC block in its queue. As one skilled in the art will appreciate, any function for any protocol used as the transport layer 80 can be formed into tasks that the Transaction Interface 210 can call.

As a further example, FIG. 5 shows an embodiment of the invention that is using Function Control Protocol as its transport layer 80. Notice that the Transaction Hardware 205, Transaction Interface 210, and Kernel 220 have the same function as the embodiment shown in FIG. 3. Further, the Serial Bus Management Task 235 and Application Task 275 are also similar to the embodiment shown in FIG. 3. However, some tasks such as the Application/FCP Command Execution Task 295 will be created specifically for the protocol used, in this case FCP. The CSR Management Task 285 is an alternative method to include the CSR services, required to implement a 1394 bus. In the embodiment shown in FIG. 3, these services are handled by the Serial Bus Management Task 235.

Figure 6:
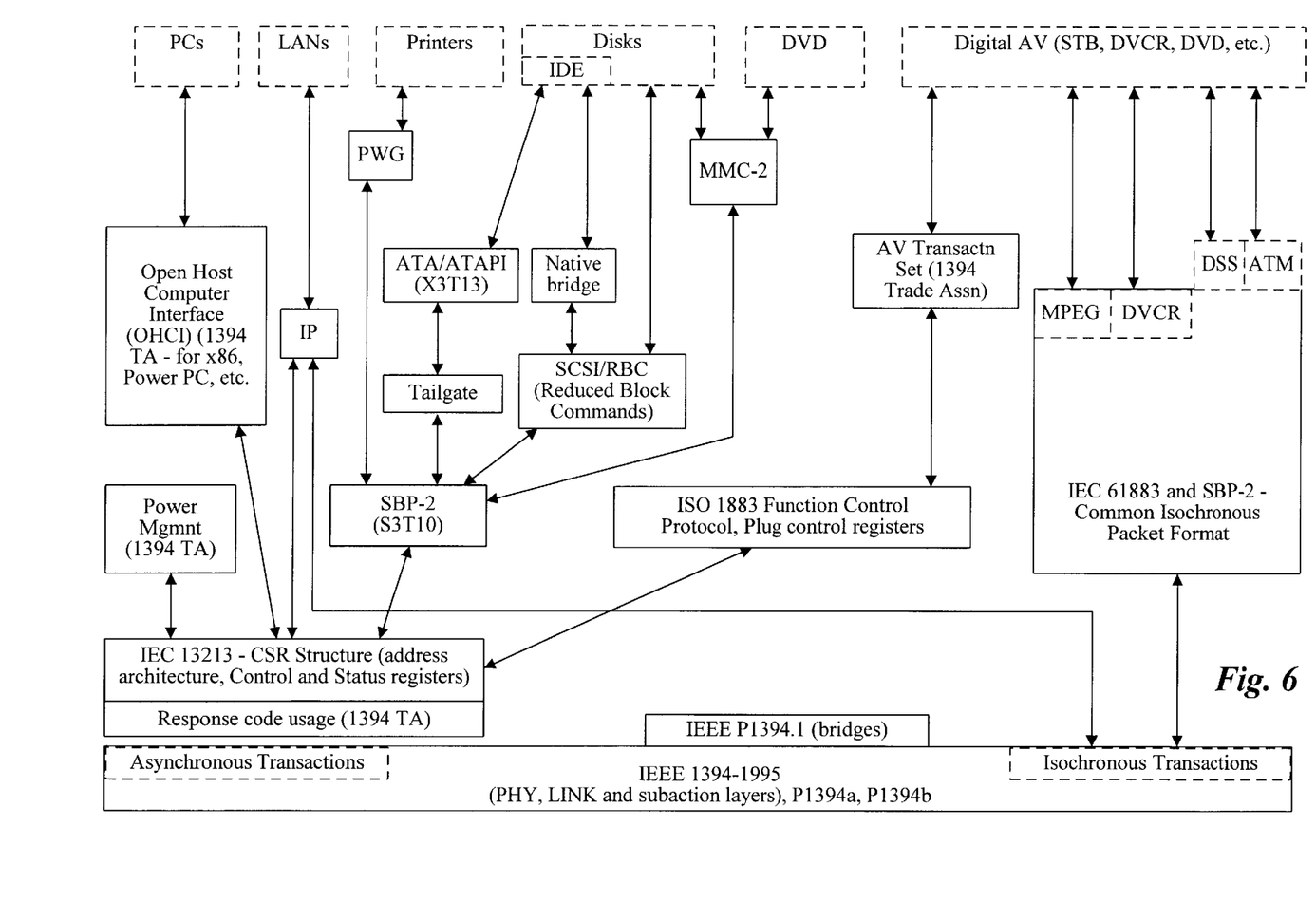
FIG. 6 is a chart showing applications and protocols that can be used with a 1394 bus.

Some of the possible applications and protocols for use with a 1394 bus are shown in FIG. 6. The 1394 bus, using the Communications Controller 200 as described herein, allows almost any type of peripheral device to be connected to one another. In FIG. 6, the 1394 bus is represented at the bottom of the figure and shows that it contains both asynchronous and isochronous capabilities. The next layer above the 1394 bus shows examples of the transport layer 80 shown in FIG. 2. Shown are SBP-2, FCP and SBP-2 common isochronous packet format. The next layer above the transport layer 80 shows examples of the application layer 90, as shown in FIG. 2. Shown are upper level protocols, such as MMC-2 used for hard disk drives and digital video disk drives, PWG, a protocol for use with printers, RBC, another protocol often used with hard disk drives, and an AV transaction set, used for consumer electronic devices. Next, shown above the application layer 90, are the devices that use the protocols listed underneath them, including printers, hard disc drives, DVD players, etc. Of course, other peripheral devices can use the 1394 bus to their advantage other than those listed here, and with different application or transport protocols. As stated above, this expands the compatibility of the 1394 bus with other buses.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. On a node coupled to a serial bus, a communication controller comprising:

a plurality of separate, independent task circuits coupled to the serial bus, each task circuit performing a specialized function responsive to data provided to it;

a transaction interface structured to accept data packets from the serial bus and to perform actions only in response to calls from a task circuit and responsive to data contained within the data packets for isochronous and asynchronous data transfer; and a dispatcher structured to receive information provided to it and to issue start commands only in response to calls from a task circuit and to the information received;

wherein each task circuit scheduled to execute when data is provided to it by the transaction interface or any of the other task circuits, each task circuit structured to execute until it has exhausted all of the data provided to it, each task circuit configured to execute after the dispatcher issues a start command for that task circuit, the start command issued by the dispatcher only when the dispatcher receives an indication from the transaction interface or the task circuit that provided data to the task circuit that the particular task circuit is not presently executing, and each task circuit structured to operate concurrently with and independently from all of the other task circuits.

2. The controller of claim 1 further including at least one data holding queue associated with each task, the transaction interface and the dispatcher, the queues structured to accept data from the transaction interface or any of the other tasks when the task, transaction interface, or dispatcher is desired to be called by any of the other tasks.

3. The controller of claim 2 wherein the data accepted into the queue is a message control block structured to be formatted with data particular to the respective queue's task, the dispatcher, or the transaction interface.

4. The controller of claim 3 wherein the dispatcher is called to issue a start command if a particular message control block is placed in one of the task's queue and that message control block is at the top of the queue.

5. The controller of claim 1 further including a kernel and wherein more than one task can be operating at the same time, wherein some of the operations may require the task that is performing the particular operation be temporarily suspended, and wherein the kernel can utilize any time that would have been used by the suspended task.

6. The controller of claim 5 wherein any of the tasks that are operating can utilize any time that would have been used by the suspended task.

7. The controller of claim 1 wherein the tasks are structured to perform operations required by the SBP-2 protocol.

8. The controller of claim 1 wherein tasks can be added, substituted, or deleted in order for the controller to be structured to perform functions required by any transport layer protocol.

9. On a node coupled to a serial bus, a communication controller comprising:

one or more tasks coupled to the serial bus each task having its own queue, each task structured to perform a specialized function responsive to data retrieved from their respective queue;

a transaction interface having a transaction interface queue, the transaction interface structured to accept data packets from the bus and to perform actions only in response to calls from a task and to data contained within the data packets for isochronous and asynchronous data transfer; and a dispatcher having a dispatcher queue, the dispatcher structured to accept information sent to the dispatcher queue only in response to calls from a task;

wherein each task scheduled to execute when data is placed in its queue by the transaction interface or any of the other tasks, each task structured to remove data from the top of its queue when the data is no longer being operated on, each task executed after the dispatcher issues a start command for that task, the start command issued by the dispatcher only when the dispatcher has data placed in its queue indicating that the particular task is not presently executing, and each task structured to operate concurrently with and independently from all of the other tasks.

10. The controller of claim 9 wherein the data placed into the queues is a message control block that is structured particularly for the service or task that operates on it.

11. The controller of claim 10 wherein the dispatcher is called to issue a start command if one of the message control blocks is placed in one of the task's queue and that message control block is at the top of the queue.

12. The controller of claim 9 further including a kernel and wherein multiple tasks can operate at the same time, wherein some of the operations may require one or more tasks to be suspended, and wherein the kernel or the other tasks can utilize any time that would have been used by the suspended task or tasks.

13. The controller of claim 9 wherein the tasks are structured to perform operations required by the FCP/CMP protocol according to the IEC 61883 standard.

14. The controller of claim 9 wherein tasks can be added, substituted, or deleted in order for the controller to be structured to perform functions required by any transport layer protocol.

15. A method of communicating over a serial bus comprising, at a node on the serial bus:

receiving packets of information from the serial bus at a transaction interface that is configured to perform isochronous and asynchronous data transfer:

decoding the packets and analyzing the information received only in response to a call from a task to determine if a service or a task should be called;

if a service or task is to be called, formatting data to be placed into a queue associated with one of a plurality of services or tasks;

placing the data into the respective queue of the service or the service or task being called;

starting the service or task if no data was already present in the respective queue of the service or task being called;

removing data from the queue when it is no longer being operated upon by the service or task; and continue operating by the service or task being called until all data is removed from the queue.

16. The method of claim 15 wherein, at the same node, more than one service or task can be operating at the same time, and wherein the services and tasks operate independently from each other.

17. The method of claim 15 wherein a set of tasks is selected so that any transport layer protocol requirements can be satisfied.

18. The method of claim 15 wherein the queue that accepts formatted data is associated with more than one of the plurality of services or tasks.

19. The method of claim 15 further comprising, after placing data into the respective queue, scheduling to be started the task or service to be executed.

20. The method of claim 15 wherein data to be placed in the queues is in the form of message control blocks, each message control block structured specifically to be operated on by only a particular one of the tasks or services.

21. The method of claim 20 wherein formatting a message control block to be placed in one of the queues comprises:

requesting a free message control block from a kernel;

after the kernel provides a free message control block, transferring data specific to the task or service desired to be called into the message control block; and placing the message control block into the task's or service's respective queue.

22. The method of claim 21 wherein starting the service or task comprises:

after placing the message control block into the task's or service's respective queue, sending a return code back to the task that placed the message control block in the queue;

inspecting the return code; and if the return code indicates that the message control block was placed at the top of a queue, calling a dispatcher to start the task or service that is desired to be called.

23. An electronic readable medium whose contents allow an electronic device to communicate over a serial bus comprising, at a node on the serial bus the steps of:

receiving packets of information from the bus at a receiving bay of a transaction interface that is configured to perform isochronous and asynchronous data transfer;

decoding the packets and analyzing the information received only in response to a call from a task to determine if a task should be called;

if a task is to be called, formatting data to be placed into a queue associated with at least one of a plurality of tasks and queuing the data into the respective queue of the task being called;

starting the task if the data was placed in the top of the respective queue of the task being called; and continue operating by the task being called until all data is removed from the queue.

24. The electronic readable medium of claim 23 wherein more than one service or task can be operating simultaneously and independently from each other.

25. The electronic readable medium of claim 23 wherein a set of tasks is selected so that all functions that are required when the FCP/CMP protocol according to the IEC 61883 standard is used as a transport layer can be performed by the tasks.

26. The electronic readable medium of claim 23 further comprising, after queuing data into the respective queue, scheduling to be started the task to be executed.

27. The electronic readable medium of claim 23 wherein decoding the packets and analyzing the information also includes determining whether a service should be called, and if so, calling the service.

28. The electronic readable medium of claim 23 wherein the serial bus conforms to any of the IEEE 1394 standards.

29. The electronic readable medium of claim 23 wherein data to be placed in the queues is in the form of a message control block, each message control block contains data specifically used by one of the tasks or services.

30. The method of claim 29 wherein formatting a message control block to be placed in one of the queues comprises:

sending a command to request a free message control block from a kernel;

when a free message control block is provided, filling message control block with data specific to the task or service desired to be called; and queuing the message control block into the task's or service's respective queue,.

31. The method of claim 30 wherein starting the service or task comprises:

after queuing the message control block into the task's or service's respective queue, sending a return code back to the queuing task;

inspecting the return code; and if the return code indicates that the called task or service was not already started, calling a dispatcher to start the task or service that is desired to be called.

* * * * *